United States Patent [19]

Kaul et al.

[11] 3,723,879

[45] Mar. 27, 1973

[54] DIGITAL DIFFERENTIAL PULSE CODE MODEM

[75] Inventors: Pradman P. Kaul, Washington, D.C.; Leonard S. Golding, Rockville, Md.

[73] Assignee: Communications Satellite Corporation, Washington, D.C.

[22] Filed: Dec. 30, 1971

[21] Appl. No.: 214,271

[52] U.S. Cl. .....325/38 R, 179/15.55 R, 178/DIG. 3, 179/15 AP

[51] Int. Cl. ....H04b 1/66

[58] Field of Search.........325/38 R, 38 A, 38 B, 321, 325/141; 178/DIG. 3, 68; 179/15.55 T, 15.55 R, 15 AC, 15 AP, 15 AV, 15 BW; 332/9, 11 R, 11 D

[56] References Cited

UNITED STATES PATENTS

| | | | |
|---|---|---|---|
| 3,422,227 | 1/1969 | Brown | 325/38 R |
| 3,646,445 | 2/1972 | Reindl | 325/38 A |
| 3,649,751 | 3/1972 | So | 325/38 A |
| 3,662,266 | 5/1972 | Limb et al. | 325/38 B |

*Primary Examiner*—Thomas A. Robinson
*Attorney*—Richard C. Sughrue et al.

[57] ABSTRACT

A differential pulse code modem receives digitally quantized samples of an input analog signal and produces digital words or codes representing difference levels. Each output word represents the difference between successive input samples. A comparable differential pulse code modem receives the digital words representing difference levels and reconstructs the original quantized samples. The quantized samples are then reconverted into a replica of the original analog signal. The bit rate of a communications system using said modem is reduced by transmitting digital words, some of which uniquely represent a single difference level, and some of which represent two distinct difference levels. Thus the total number of unique digital output words which can be transmitted is less than the total number of difference levels, about which information must be conveyed to the receiver. The apparent ambiguity caused by sending a digital word which represents two distinct difference levels is resolved by a technique which uses the same digital word to represent only disjoint difference levels.

When subtracting a preceding sample from the present or current sample the resulting difference level cannot exceed a maximum positive or negative value determined by the dynamic range of the sample values. Two difference levels are disjoint if there exists no possible value for the preceding sample which could result in both difference levels.

The same digital word is sent out whether the difference level information to be conveyed is the first or the second difference level. The reconstructed prior sample provides the information needed to exclude one of the disjoint levels represented by the received digital word.

22 Claims, 10 Drawing Figures

DIGITAL DIFFERENTIAL PULSE CODE MODEM

BACKGROUND OF THE INVENTION

This invention is in the field of differential pulse code modems (modulator-demodulator), and more particularly is a digital differential pulse code modem using disjoint intervals.

A pulse code modulator, as is well known, receives an analog input signal, samples the analog input signal at a sample rate and converts each sample into a digital equivalent. Assuming a quantization of six binary bits per sample, the possible dynamic range is 64 sample levels i.e., 0 to 64 or −32 to +31, etc. In all such systems which convert analog signals into digital signals there is a certain amount of quantization noise. The quantization noise is dependent upon the analog difference between adjacent quantization levels. For example, assume an input signal which can vary between 0v. and 64v. is quantized into six bit digital words. Thus an analog sample of 5.1, 5.2, 5.3 or 5.9 volts will be quantized into a digital word representing 6.0 volts. The difference between the actual value of the sample, e.g., 5.3 volts, and the value represented by the digital word, e.g. 6 volts, is quantization noise.

Quantization noise can be reduced by increasing the number of levels for a given input range. Thus assuming the same dynamic input range, 0 – 64 volts, a seven bit quantization per sample will provide 128 possible levels, with the difference between levels being only one half volt rather than a full volt as in the previous case. While this technique reduces quantization noise it increases the number of bits per sample thereby increasing the bit rate for the output signal. An increased bit rate requires a great bandwidth in any communications system. In most communications systems, especially commercial systems, e.g. satellite communications, it is desirable to increase the amount of information per bandwidth ratio. Research is continuously being directed towards reducing the bandwidth required to transmit a given amount of information, or stated otherwise, towards increasing the amount of information which can be transmitted over a given bandwidth. Thus, reducing quantization noise by increasing the number of bits per sample is not satisfactory.

Differential pulse code modulators have been used to reduce quantization noise in systems where it is most important to reduce such noise without increasing the bandwidth. Typically in a differential pulse code modulator (DPCM) the input signal sample is subtracted from the prior sample thereby forming a difference level. The difference level is then quantized into a digital word. The DPCM takes advantage of the fact that statistically the sample values will not vary much from sample to sample and therefore most difference values to be quantized will be quite small. Quantization is improved for a given number of bits per quantized difference value by packing the quantization levels close together at the low range of difference values and placing the quantization levels relatively far apart at the high range of difference values. Even though large difference values will result in a relatively high quantization noise, the total quantization noise will be reduced because most difference values will fall at the low range where the quantization levels are closely packed.

A further advance over the DPCM described is a digital DPCM, e.g., as disclosed in copending U.S. Pat. Application Ser. No. 38,951, filed May 20, 1970 by Gabbard and Kaul and assigned to the same assignee herein. The digital DPCM quantizes the input samples prior to subtraction and, by a technique disclosed in the aforementioned patent application, achieves a reduction in the output bit rate. The reduction in bit rate is achieved, essentially, by ignoring relatively large sample-to-sample variances. The system described in the above mentioned application takes advantage of the fact that most difference values will be within a limited range.

The latter described systems have the disadvantage that they do not faithfully reproduce the input signal waveform at points where the input signal waveform takes a sharp jump in either the positive or negative direction. Although this may not be of sufficient importance in some cases, it is important where one is attempting to digitally transmit television (TV) pictures and faithfully reproduce the picture at the reception end of a system. In a TV picture the "edges," which correspond to the outline of any object, e.g., a person against a background, appear in the video waveform as sharp amplitude jumps. Stated otherwise, when an edge occurs in the video signal there will be a large difference between successive samples. In the aforementioned systems, where large differences are ignored, it may take a period of time equivalent to four or five sample periods for the receiver to track the amplitude jump which actually took place in the original video signal in less than one sample period.

Another type of prior art DPCM takes care of the edge problem by using relatively few bits to indicate a non edge difference value and a larger number of bits to represent edge levels. An example of such systems is shown in the U.S. patent to E. F. Brown, U.S. Pat. No. 3,442,227. There, every difference level within the non-edge range is represented by a four bit code whose value corresponds to the difference level. Every edge level is represented by eight bits. Four of the eight bits constitute a marker or flag which indicates the presence of a difference value in the edge range. The remaining four bits indicate the value of the difference level.

SUMMARY OF THE INVENTION

The present invention is a digital differential pulse code modem which achieves bit rate reduction, but not at the cost of ignoring TV edges.

In the DPCM of the present invention the quantization levels are spread over the entire range of possible difference values. However, many of the quantization code words, representing quantization levels, are used to represent two distinct quantization levels, hereinafter referred to as disjoint levels. By making multiple use of the same code words, there is a savings in the number of bits per code word required to transmit information about the quantization levels. The ambiguity is resolved since any two disjoint levels, represented by the same code word, are selected so that only one is possible for a given prior sample value.

The DPCM receives quantized samples $S_i$, where $i$ represents present time, and forms a digital difference value, $\Delta_i$, by subtracting $S_i - S_{i-1}$. A binary code word $\Delta_t^*$, representing the difference value $\Delta_t$ is transmitted. In many cases the particular code word $\Delta_t^*$ not only represents the value of $\Delta_t$ but also represents another difference value, the two difference values being disjoint. At the receiver, when $\Delta_t^*$ is received, $S_{t-1}$ will already have been reconstructed and stored. The value of $S_{t-1}$ removes the ambiguity in $\Delta_t^*$ representing two difference values, and the proper $\Delta_t$ value represented by $\Delta_t^*$ is added to $S_{t-1}$ to reconstruct the sample $S_t$.

DETAILED DESCRIPTION OF THE INVENTION

Figure 1:
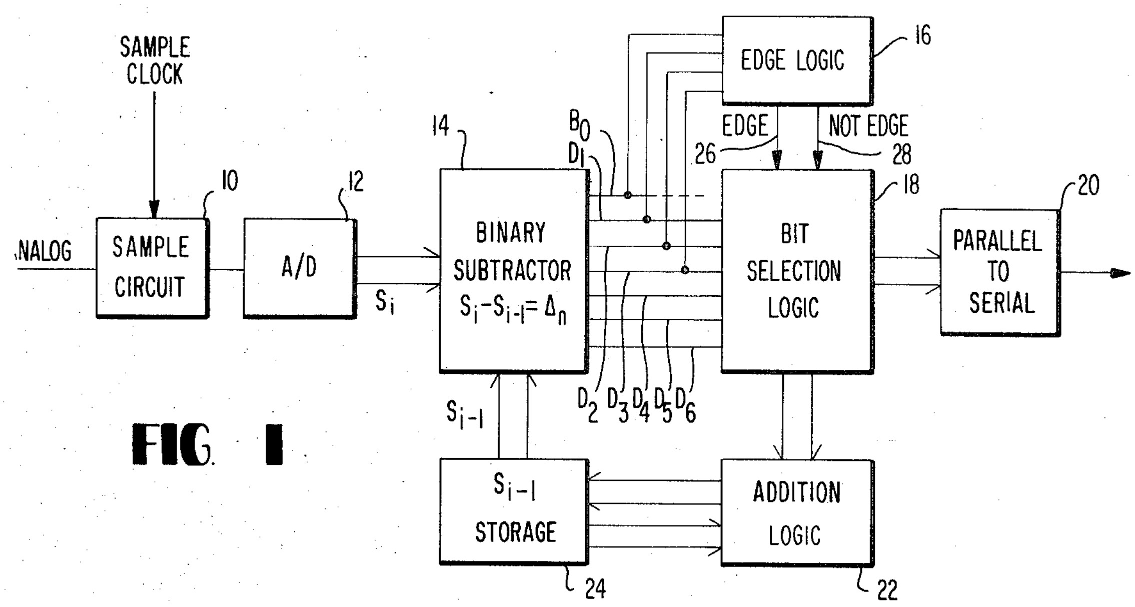
FIG. 1 is a block diagram of the transmit side of a differential pulse code modem.

The invention will be explained by initially considering a specific example of the DPCM. For this example it is assumed that an analog input waveform is sampled and each sample is quantized into a six bit binary representation, S, of the sample value. The output from the DPCM is a five bit binary code word representing a quantized difference level.

The quantized samples then can have any value in the range between 000000 and 111111 (i.e., 0 to 63), and this range is the dynamic range of the samples of the input signal. The difference value, $\Delta_t$, is formed by subtracting the prior sample, $S_{t-1}$, from the present sample, $S_t$, and can be any value from +63 to −63. Table I below shows all possible difference values obtained by subtracting two six bit binary words. (The term "vector" is used herein interchangeably with the term "word" as is common in digital parlance). Note, that seven bits including the borrow bit, $B_0$, are necessary to represent the difference values.

The subject invention sends out five bits per sample to represent 46 quantized levels. This seems impossible since five bits can only have 32 unique combinations. However, it is accomplished by using disjoint levels in the edge range and by using the same code to represent two disjoint levels.

Two difference levels are defined as disjoint levels if there is no possible value for the preceding sample, $S_{t-1}$, which could result in both difference levels. For example, assume a range of 64 levels, 0 to 63. Also assume that the same four bit code, $\Delta_t^*$, represents disjoint levels +53 and −10. When the code (−53, −10) is received it is apparent that only one can be correct. The sample values can only be in the range from 0 to +63. If the prior sample is anywhere between 0 and +9, then the code must represent +53 because a −10, if added to the prior sample, would mean that the present sample is outside of the dynamic range — an impossible situation. If the prior sample has any value between +10 and +63 then the code must represent − 10, because a difference value of +53, if added to the prior sample, would mean that the present sample is outside the dynamic range. There exists no prior sample value which could be common to both +53 and −10. Thus, by knowing the dynamic range and the value of sample $S_{t-1}$, a given number of bits can be used to represent twice as many difference levels or values as the number of unique combinations possible with said bits.

In the specific DPCM used herein, disjoint levels are used in coding the quantized difference levels. However, disjoint levels are used only for the edge ranges. Normal, as distinct from disjoint, difference levels are used for the non-edge range, which in the specific example to be described, is from $\Delta_t = +7$ to $\Delta_t = -8$.

TABLE I

| | $B_0$ | $D_1$ | $D_2$ | $D_3$ | $D_4$ | $D_5$ | $D_6$ | | $B_0$ | $D_1$ | $D_2$ | $D_3$ | $D_4$ | $D_5$ | $D_6$ | | $B_0$ | $D_1$ | $D_2$ | $D_3$ | $D_4$ | $D_5$ | $D_6$ |
|---|---|---|---|---|---|---|---|---|---|---|---|---|---|---|---|---|---|---|---|---|---|---|---|
| +63 | (0) | 1 | 1 | 1 | 1 | 1 | 1 | +20 | (0) | 0 | 1 | 0 | 1 | 0 | 0 | −22 | (1) | 1 | 0 | 1 | 0 | 1 | 0 |
| +62 | (0) | 1 | 1 | 1 | 1 | 1 | 0 | +19 | (0) | 0 | 1 | 0 | 0 | 1 | 1 | −23 | (1) | 1 | 0 | 1 | 0 | 0 | 1 |
| +61 | (0) | 1 | 1 | 1 | 1 | 0 | 1 | +18 | (0) | 0 | 1 | 0 | 0 | 1 | 0 | −24 | (1) | 1 | 0 | 1 | 0 | 0 | 0 |
| +60 | (0) | 1 | 1 | 1 | 1 | 0 | 0 | +17 | (0) | 0 | 1 | 0 | 0 | 0 | 1 | −25 | (1) | 1 | 0 | 0 | 1 | 1 | 1 |
| +59 | (0) | 1 | 1 | 1 | 0 | 1 | 1 | +16 | (0) | 0 | 1 | 0 | 0 | 0 | 0 | −26 | (1) | 1 | 0 | 0 | 1 | 1 | 0 |
| +58 | (0) | 1 | 1 | 1 | 0 | 1 | 0 | +15 | (0) | 0 | 0 | 1 | 1 | 1 | 1 | −27 | (1) | 1 | 0 | 0 | 1 | 0 | 1 |
| +57 | (0) | 1 | 1 | 1 | 0 | 0 | 1 | +14 | (0) | 0 | 0 | 1 | 1 | 1 | 0 | −28 | (1) | 1 | 0 | 0 | 1 | 0 | 0 |
| +56 | (0) | 1 | 1 | 1 | 0 | 0 | 0 | +13 | (0) | 0 | 0 | 1 | 1 | 0 | 1 | −29 | (1) | 1 | 0 | 0 | 0 | 1 | 1 |
| +55 | (0) | 1 | 1 | 0 | 1 | 1 | 1 | +12 | (0) | 0 | 0 | 1 | 1 | 0 | 0 | −30 | (1) | 1 | 0 | 0 | 0 | 1 | 0 |
| +54 | (0) | 1 | 1 | 0 | 1 | 1 | 0 | +11 | (0) | 0 | 0 | 1 | 0 | 1 | 1 | −31 | (1) | 1 | 0 | 0 | 0 | 0 | 1 |
| +53 | (0) | 1 | 1 | 0 | 1 | 0 | 1 | +10 | (0) | 0 | 0 | 1 | 0 | 1 | 0 | −32 | (1) | 1 | 0 | 0 | 0 | 0 | 0 |
| +52 | (0) | 1 | 1 | 0 | 1 | 0 | 0 | +9 | (0) | 0 | 0 | 1 | 0 | 0 | 1 | −33 | (1) | 0 | 1 | 1 | 1 | 1 | 1 |
| +51 | (0) | 1 | 1 | 0 | 0 | 1 | 1 | +8 | (0) | 0 | 0 | 1 | 0 | 0 | 0 | −34 | (1) | 0 | 1 | 1 | 1 | 1 | 0 |
| +50 | (0) | 1 | 1 | 0 | 0 | 1 | 0 | +7 | (0) | 0 | 0 | 0 | 1 | 1 | 1 | −35 | (1) | 0 | 1 | 1 | 1 | 0 | 1 |
| +49 | (0) | 1 | 1 | 0 | 0 | 0 | 1 | +6 | (0) | 0 | 0 | 0 | 1 | 1 | 0 | −36 | (1) | 0 | 1 | 1 | 1 | 0 | 0 |
| +48 | (0) | 1 | 1 | 0 | 0 | 0 | 0 | +5 | (0) | 0 | 0 | 0 | 1 | 0 | 1 | −37 | (1) | 0 | 1 | 1 | 0 | 1 | 1 |
| +47 | (0) | 1 | 0 | 1 | 1 | 1 | 1 | +4 | (0) | 0 | 0 | 0 | 1 | 0 | 0 | −38 | (1) | 0 | 1 | 1 | 0 | 1 | 0 |
| +46 | (0) | 1 | 0 | 1 | 1 | 1 | 0 | +3 | (0) | 0 | 0 | 0 | 0 | 1 | 1 | −39 | (1) | 0 | 1 | 1 | 0 | 0 | 1 |
| +45 | (0) | 1 | 0 | 1 | 1 | 0 | 1 | +2 | (0) | 0 | 0 | 0 | 0 | 1 | 0 | −40 | (1) | 0 | 1 | 1 | 0 | 0 | 0 |
| +44 | (0) | 1 | 0 | 1 | 1 | 0 | 0 | +1 | (0) | 0 | 0 | 0 | 0 | 0 | 1 | −41 | (1) | 0 | 1 | 0 | 1 | 1 | 1 |
| +43 | (0) | 1 | 0 | 1 | 0 | 1 | 1 | 0 | (0) | 0 | 0 | 0 | 0 | 0 | 0 | −42 | (1) | 0 | 1 | 0 | 1 | 1 | 0 |
| +42 | (0) | 1 | 0 | 1 | 0 | 1 | 0 | −1 | (1) | 1 | 1 | 1 | 1 | 1 | 1 | −43 | (1) | 0 | 1 | 0 | 1 | 0 | 1 |
| +41 | (0) | 1 | 0 | 1 | 0 | 0 | 1 | −2 | (1) | 1 | 1 | 1 | 1 | 1 | 0 | −44 | (1) | 0 | 1 | 0 | 1 | 0 | 0 |
| +40 | (0) | 1 | 0 | 1 | 0 | 0 | 0 | −3 | (1) | 1 | 1 | 1 | 1 | 0 | 1 | −45 | (1) | 0 | 1 | 0 | 0 | 1 | 1 |
| +39 | (0) | 1 | 0 | 0 | 1 | 1 | 1 | −4 | (1) | 1 | 1 | 1 | 1 | 0 | 0 | −46 | (1) | 0 | 1 | 0 | 0 | 1 | 0 |
| +38 | (0) | 1 | 0 | 0 | 1 | 1 | 0 | −5 | (1) | 1 | 1 | 1 | 0 | 1 | 1 | −47 | (1) | 0 | 1 | 0 | 0 | 0 | 1 |
| +37 | (0) | 1 | 0 | 0 | 1 | 0 | 1 | −6 | (1) | 1 | 1 | 1 | 0 | 1 | 0 | −48 | (1) | 0 | 1 | 0 | 0 | 0 | 0 |

TABLE I – Continued

| | $B_0$ | $D_1$ | $D_2$ | $D_3$ | $D_4$ | $D_5$ | $D_6$ |
|---|---|---|---|---|---|---|---|
| +36 | (0) | 1 | 0 | 0 | 1 | 0 | 0 |
| +35 | (0) | 1 | 0 | 0 | 0 | 1 | 1 |
| +34 | (0) | 1 | 0 | 0 | 0 | 1 | 0 |
| +33 | (0) | 1 | 0 | 0 | 0 | 0 | 1 |
| +32 | (0) | 1 | 0 | 0 | 0 | 0 | 0 |
| +31 | (0) | 0 | 1 | 1 | 1 | 1 | 1 |
| +30 | (0) | 0 | 1 | 1 | 1 | 1 | 0 |
| +29 | (0) | 0 | 1 | 1 | 1 | 0 | 1 |
| +28 | (0) | 0 | 1 | 1 | 1 | 0 | 0 |
| +27 | (0) | 0 | 1 | 1 | 0 | 1 | 1 |
| +26 | (0) | 0 | 1 | 1 | 0 | 1 | 0 |
| +25 | (0) | 0 | 1 | 1 | 0 | 0 | 1 |
| +24 | (0) | 0 | 1 | 1 | 0 | 0 | 0 |
| +23 | (0) | 0 | 1 | 0 | 1 | 1 | 1 |
| +22 | (0) | 0 | 1 | 0 | 1 | 1 | 0 |
| +21 | (0) | 0 | 1 | 0 | 1 | 0 | 1 |

| | $B_0$ | $D_1$ | $D_2$ | $D_3$ | $D_4$ | $D_5$ | $D_6$ |
|---|---|---|---|---|---|---|---|
| −7 | (1) | 1 | 1 | 1 | 0 | 0 | 1 |
| −8 | (1) | 1 | 1 | 1 | 0 | 0 | 0 |
| −9 | (1) | 1 | 1 | 0 | 1 | 1 | 1 |
| −10 | (1) | 1 | 1 | 0 | 1 | 1 | 0 |
| −11 | (1) | 1 | 1 | 0 | 1 | 0 | 1 |
| −12 | (1) | 1 | 1 | 0 | 1 | 0 | 0 |
| −13 | (1) | 1 | 1 | 0 | 0 | 1 | 1 |
| −14 | (1) | 1 | 1 | 0 | 0 | 1 | 0 |
| −15 | (1) | 1 | 1 | 0 | 0 | 0 | 1 |
| −16 | (1) | 1 | 1 | 0 | 0 | 0 | 0 |
| −17 | (1) | 1 | 0 | 1 | 1 | 1 | 1 |
| −18 | (1) | 1 | 0 | 1 | 1 | 1 | 0 |
| −19 | (1) | 1 | 0 | 1 | 1 | 0 | 1 |
| −20 | (1) | 1 | 0 | 1 | 1 | 0 | 0 |
| −21 | (1) | 1 | 0 | 1 | 0 | 1 | 1 |

| | $B_0$ | $D_1$ | $D_2$ | $D_3$ | $D_4$ | $D_5$ | $D_6$ |
|---|---|---|---|---|---|---|---|
| −49 | (1) | 0 | 0 | 1 | 1 | 1 | 1 |
| −50 | (1) | 0 | 0 | 1 | 1 | 1 | 0 |
| −51 | (1) | 0 | 0 | 1 | 1 | 0 | 1 |
| −52 | (1) | 0 | 0 | 1 | 1 | 0 | 0 |
| −53 | (1) | 0 | 0 | 1 | 0 | 1 | 1 |
| −54 | (1) | 0 | 0 | 1 | 0 | 1 | 0 |
| −55 | (1) | 0 | 0 | 1 | 0 | 0 | 1 |
| −56 | (1) | 0 | 0 | 1 | 0 | 0 | 0 |
| −57 | (1) | 0 | 0 | 0 | 1 | 1 | 1 |
| −58 | (1) | 0 | 0 | 0 | 1 | 1 | 0 |
| −59 | (1) | 0 | 0 | 0 | 1 | 0 | 1 |
| −60 | (1) | 0 | 0 | 0 | 1 | 0 | 0 |
| −61 | (1) | 0 | 0 | 0 | 0 | 1 | 1 |
| −62 | (1) | 0 | 0 | 0 | 0 | 1 | 0 |
| −63 | (1) | 0 | 0 | 0 | 0 | 0 | 1 |

Five bits are transmitted for each difference value obtained in the DPCM. Four of the five bits represent a value and the fifth bit indicates whether or not the value is within or outside of the edge region. For the example being described, the symbol $\Delta_t^*$ represents the four bit binary vector and the symbol $k$ represents the additional fifth bit which indicates the range.

The edge levels are shown in Table II below. The 16 codes which represent the 16 non-edge levels also represent 28 edge levels. Note that each edge level code except 1110, 1111, 0000 and 0001 represents two disjoint levels. The latter four codes represent only four edge levels. This is not due to any deficiency in the use of disjoint levels. Rather, it is due to the ease of implementation with binary numbers.

The decimal numbers next to the four bit codes in the edge level table show the correspondance between the levels shown in Table I and those shown in the edge table. It can be seen that in the edge range the levels are four times the size of the levels in the non edge range.

Although the decimal numbers indicate the specific quantization levels used in the example described, it will be apparent that other quantization levels could be selected. For example, instead of selecting +20 and +24 as quantization levels, one may choose +21 and +25, or +26. The actual difference level selected as a quantization level is certainly not critical and may be selected for their convenience in implementation.

In the example shown in Table II any difference value between +8 and +11 will be quantized as +8; any difference value between +12 and +15 will be quantized as +12; etc. These groupings make it simple to quantize the difference values. For example assuming a difference value of +9, (001001), one can quantize that difference value as level +8 by simply replacing the two low order bits with zeroes. For the positive edge levels shown in Table II, the four bit codes are obtained by simply dropping the two low order bits of the difference value. Thus differences of +8, +9, +10, and +11 will be coded as 0010, representing the edge level +8. A fifth bit, designated $k$, is tacked on to indicate that the four bit code represents an edge level. The four bit code can be converted back into a six bit difference value simply by adding two zero bits.

Table II also shows the negative edge levels. The levels are selected so that difference values −12, −13, −14, −15 are quantized as −12; difference values −16, −17, −18, −19 are quantized as −16; etc. In this case, the four bit codes of Table II cannot be obtained by simply dropping the two low order bits, as in the case of the positive edge levels. As an example, note that −12 corresponds (1)110100 and −13 corresponds to (1)110011. If we simply dropped the two low order bits we would be quantizing −13 difference value as a −16 edge level. Although this could be done, it is not our choice for reasons to be explained hereinafter. To properly quantize difference values falling in the negative edge region, the two low order bits are dropped and a "1" bit is added to the remaining four bit vector. Thus, if $\Delta_t = -13$, the code 1101 is obtained by dropping the two low order bits, $D_5$ and $D_6$, and adding a single one bit to $D_1D_2D_3D_4$. A fifth bit (1) is tacked on resulting in the five bit vector 11101. The one bit in the first position indicates an edge level, and the other four bits indicate the value of the level.

From Table II it is seen that most of the four bit codes represent two edge levels and one non edge level. For example 1100 represents level −16, +48, and −4. The fifth bit distinguishes the edge from the non edge levels. Thus if the fifth bit is 0, resulting in the vector 01100, the −4 level is identified. If the added bit is a "1" bit, signifying an edge level (11100), it is known that the level identified by this five bit vector is either −16 or +48. these two levels are disjoint.

TABLE II

| NON EDGE LEVELS | | EDGE LEVELS | |
|---|---|---|---|
| +7 | 0111 | | |
| +6 | 0110 | – | 0001 –α |
| +5 | 0101 | +8 | 0010 –56 |
| +4 | 0100 | +12 | 0011 **–52** |
| +3 | 0011 | +16 | 0100 –48 |
| +2 | 0010 | +20 | 0101 –44 |
| +1 | 0001 | +24 | 0110 –40 |
| 0 | 0000 | +28 | 0111 –36 |
| –1 | 1111 | +32 | 1000 –32 |
| –2 | 1110 | +36 | 1001 –28 |
| –3 | 1101 | +40 | 1010 –24 |
| –4 | 1100 | +44 | 1011 –20 |
| –5 | 1011 | +48 | 1100 –16 |
| –6 | 1010 | +52 | 1101 –12 |
| –7 | 1001 | +56 | 1110 – |
| –8 | 1000 | +60 | 1111 – |

Three examples will be given herein to explain the operation of the DPCM. In all three cases the four bit sequence 1100 will be used to demonstrate the distinction in operation for the (1) non-edge level and (2 & 3) the two disjoint edge levels.

EXAMPLE I

In all cases the DPCM receives six bit input words representing samples of the video. The prior sample, $S_{t-1}$ is subtracted from the current sample, $S_t$. Assume, for example I, that $\Delta_t$ is −4. The subtraction will provide an output:

$$(B_0)\ D_1D_2D_3D_4D_5D_6$$
$$(1)\ 1\ 1\ 1\ 1\ 0\ 0$$

(Note that in the non-edge range $D_1$, $D_2$ and $D_3$ will always be the same). The combination of a $B_0 = 1$ and $D_1$, $D_2$ and $D_3 = 1$ indicates that the difference value is in the non-edge range. Note that the coincidence of $\overline{B}_0\overline{D}_1\overline{D}_2\overline{D}_3$ would also indicates a non-edge range.

The two high order bits, $D_1$ & $D_2$, are dropped and a 0 bit is added to indicate that the four value bits designate a non-edge level. Thus, the bit sequence transmitted is 01100 ($k_t$ and $\Delta_t$*).

By the time $k_t$ and $\Delta_t$* are received at the receiver and ready for processing, the sample value $S_{t-1}$ will have been calculated at the receiver DPCM.

The sequence 01100 is received and because of the 0 in the first bit position of the sequence it is known to be a non-edge level. Since the highest order bit in the four bit value $\Delta_t$* is a 1 bit, two 1 bits are added to form the six bit sequence 111100. The two added 1 bits correspond to the bits $D_1$ and $D_2$ which were dripped at the transmit side. The above six bit sequence represents the exact difference value (4). This value is added to the stored $S_{t-1}$ to form the sample value $S_t$.

In the formation of $S_t$ at the receive side no mention was made of the value of ($B_0$), the original borrow bit. Referring to Table I it can be seen that $\Delta_t = +60$ is also represented by the six bit sequence 111100, the same as $\Delta_t = -4$. Thus, leaving out the borrow bit $B_0$, which distinguishes +60 from −4, seems to be a significant ommission. However, as will not be shown, it is in fact insignificant.

Since a −4 was originally generated, this means that the prior sample $S_{t-1}$ can have any dynamic value within the range +4 to +63, but could not possibly be +3, +2, +1 or 0. The opposite is true for the case where $\Delta_t = +60$. However, it is not even necessary for the logic to recognize this because the binary addition of 111100 to any binary value between +4 and +63 will result in the proper "six bit" result. For example, assume $S_{t-1} = +4$, then

| | | |
|---|---|---|
| $S_{t-1}$ | +4 | 000100 |
| $+\Delta_t$ | +(−4) | +111100 |
| $S_t$ | 0 | 000000 |

Note, since only six bits are in the sample, the last carry over bit is eliminated.

To continue the example, assume that $\Delta_t = +60$. This would be represented by the same notation 111100. For this case the prior sample $S_{t-1}$ has to be either +3, +2, +1 or 0. The addition comes out to be:

| | | |
|---|---|---|
| $S_{t-1}$ | +3 | 000011 |
| $+\Delta_t$ | + 60 | +111100 |
| $S_t$ | + 63 | 111111 |

The principle involved is analogous to the following. Consider a fly wheel being marked along its circumference with 64 equally spaced marks numbered 0 thru 63. The addition of +60 or −4 to some prior value on the wheel adjacent to a reference pointer can be carried out by the identical operation — namely, rotating the wheel 60 increments in the positive direction. As the sum exceeds +63, it returns to 0, +1, +2, etc. This may be referred to as foldover.

EXAMPLE II

For this case assume that $S_t - S_{-1} = \Delta_t = +48$. The binary sequence representing +48 will be 110000 with the borrow bit equal to zero. Since $B_0 = 0$, $D_1 = 1$, $D_2 = 1$ and $D_3 = 0$ we do not have a condition indicative of a non-edge level. Thus, the level is recognized as an edge level. The lowest two digits are dropped, ($D_5$ and $D_6$), resulting in the four bit value 1100, and a 1 bit is added at the front end to signify that the value represents an edge level. Thus the sequence transmitted is 11100.

On the receive side, the first 1 bit is recognized as signifying an edge level. Consequently two 0 bits are added to provide the six bit sequency 110000 which represents the binary value +48. The six bit binary number is added directly to the prior sample value $S_{t-1}$ to form the sample $S_t$.

If $\Delta_t$ had been +51, +50 or +49 instead of +48, the same five bit vector would have been transmitted. For example if $\Delta_t$ had been +50 it would have been represented by the binary vector 110010. Dropping the two low order bits and tacking on the edge indicating bit results in the five bit vector 11100 being sent to the receive side of the DPCM. The operation at the receive side will be the same as described in the preceeding paragraph. It should be noted that bits $D_5$ and $D_6$ of the reconstructed $\Delta_t$ at the receive are always zero, whereas $D_5$ and $D_6$ at the transmitter can be 00, 10, 11 or 01. However, this minor discrepancy is considered acceptable quantization noise.

EXAMPLE III

For this case assume $S_t - S_{t-1} = \Delta_t = -16$. This is represented by the binary value 110000 with the addition of a borrow bit $B_0 = 1$. Note that the borrow bit is the only distinguishing feature between $\Delta_t = +48$ and $\Delta_t = -16$. Since the condition of $B_0$, $D_1$, $D_2$ and $D_3$ indicates an edge level, the low order digits $D_5$ and $D_6$ are dropped and a one bit is tacked onto the front end of the sequence to designate an edge level. Thus the five bit sequence 11100 is transmitted. Note, this is the identical five bit sequence sent out in Example II to designate $\Delta_t = +48$. Here it is supposed to indicate $\Delta_t = -16$.

On the receive side the first one bit indicates an edge level causing two zero bits to be tacked on to form the six bit sequence 110000. In the absence of a borrow bit the decimal value represented by this sequence is +48. However, in this example the real $\Delta_t$ is −16, not +48. Notwithstanding the absence of the borrow bit, the correct sample $S_t$ will be reconstructed when 110000 is added directly to $S_{t-1}$.

The levels +48 and −16 are disjoint intervals. If $\Delta_t = -16$ the prior sample $S_{t-1}$ must have been in the range between +16 and +63. The addition of the binary number corresponding to +48 to any binary number in the range between +16 and +63, yields the same result as would the subtraction of −16 from that number, provided the carry over to the seventh bit position is dropped. For example assume $S_{t-1} = 32$, then

| | | |
|---|---|---|
| $S_{t-1}$ | 100000 | 32 |
| $+\Delta_t$ | + 110000 | + (−16) |
| $S_t$ | 010000 | 16 |

Continuing with Example III, if $\Delta_t$ had been −17, −18, or −19, instead of −16 the identical results will be achieved, but with quantization noise due to the quantization of any of those prior values as a −16 difference. As previously explained quantization is carried out in the negative edge region by dropping the bits $D_5$ and $D_6$ and adding a 1 bit to $D_4$ if and only if either $D_5$ or $D_6$ is a "1" bit. Thus, assuming $\Delta_i = -19 \equiv 101101$, dropping $D_5$ and $D_6$ leaves the vector 1011, and adding a "1" bit results in the vector 1100, representing −16.

The above examples illustrate how the same four bit value code $\Delta_i^*$ can represent three possible levels. An additional fifth bit is needed to distinguish the non-edge from the edge levels. But no distinguishing feature is needed to distinguish two disjoint edge levels.

In FIG. 1 there is shown a general block diagram of the transmit portion of the DPCM. In the description of the drawings, unless it is specifically stated otherwise, the same example of six bits for the samples $S_i$, seven bits for the difference values $\Delta_i$, four bits for the code $\Delta_i^*$, and a fifth bit, $k$, will be followed.

The analog input waveform is applied to a sample circuit 10 where it is sampled at a sample clock rate. The analog samples are applied to an analog to digital converter 12 which quantizes the analog samples into six bit digital samples. Each six bit sample is applied in parallel to a binary subtractor 14. A second input to the binary subtractor 14 is the six bit prior sample, $S_{i-1}$, which is stored in storage means 24. The binary subtractor performs binary subtraction on $S_i$ and $S_{i-1}$ to produce a seven bit output $\Delta_i \equiv B_0D_1D_2D_3D_4D_5D_6 = S_i - S_{i-1}$. Bits $B_0$, $D_1$, $D_2$ and $D_3$ of the difference $\Delta_i$ are connected to an edge logic circuit 16 which provides an output on line 26 if $\Delta_i$ is in the edge range and an output on line 28 if $\Delta_i$ is in the non-edge range.

Figure 2:
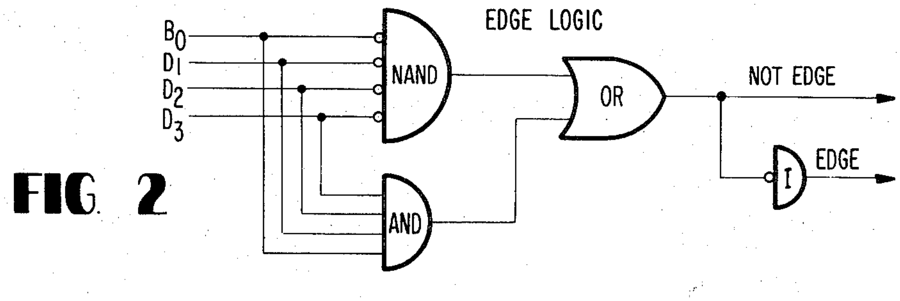
FIG. 2 is a logic diagram of a means for detecting the range of difference values, said means being suitable for use as one of the functional blocks of FIG. 1.

As pointed out above either the logic condition $B_0 \cdot D_1 \cdot D_2 \cdot D_3$ or $\overline{B_0} \cdot \overline{D_1} \cdot \overline{D_2} \cdot \overline{D_3}$ indicates a non-edge level. All other combinations of those four bits indicates an edge level. A simple self explanatory logic circuit which could be used for the edge logic of this specific example is illustrated in FIG. 2.

Figure 3:
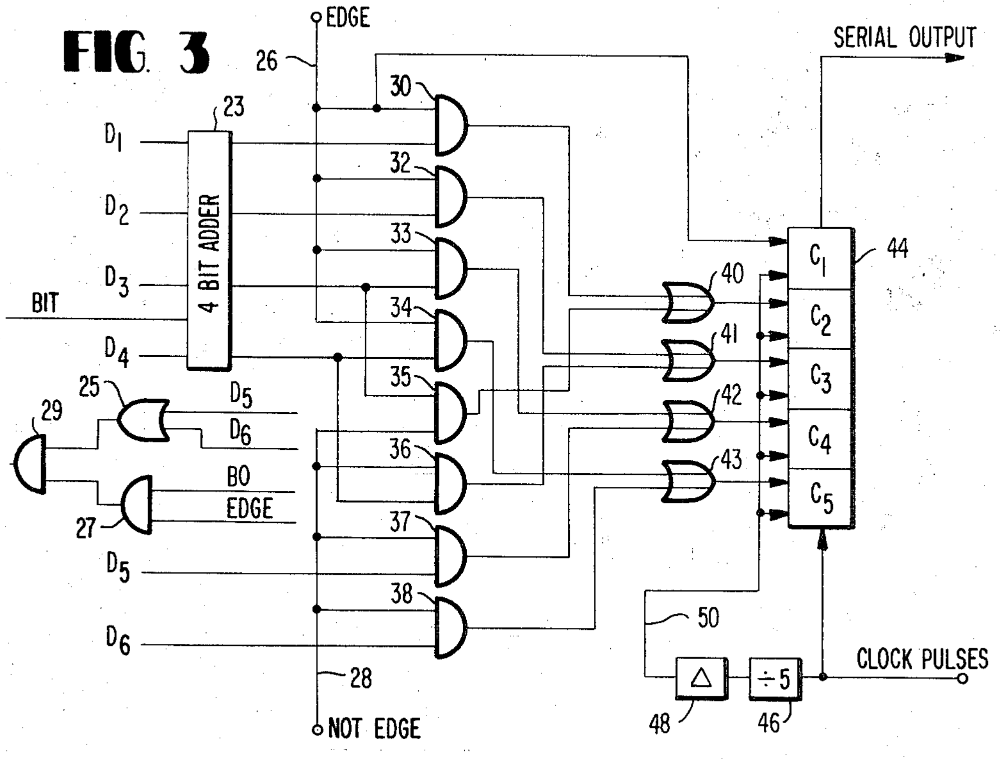
FIG. 3 is a logic diagram showing the details of the bit selection logic and parallel to serial converter of FIG. 1.

The six bits $D_1 \ldots D_6$ are applied in parallel to a bit selection logic circuit 18, which, in combination with the edge logic 16 comprises a means responsive to $\Delta_i$ for forming an output code, $\Delta_i^*$ and $k$. In the specific example herein, bit selection logic eliminates either bits $D_1$ and $D_2$ or bits $D_5$ and $D_6$, depending on whether $\Delta_i$ is a non-edge or edge level adds a "1" bit if a negative edge range is indicated and either $D_5$ or $D_6$ is a "1" bit, and supplies the additional $k$ bit to signify an edge or a non-edge level. An example of a logic circuit which would serve as a bit selection logic is shown in FIG. 3. The output of bit selection logic 18, which is five bits in parallel, is applied to a parallel to serial converter 20, also illustrated in FIG. 3.

Referring now to FIG. 3, the bit selection logic comprises AND gates 27, 29 and 30 through 38 and OR gates 25 and 40 through 43. The four bit parallel output from the OR gates 40 – 43 represents the code $\Delta_i^*$.

The four bits $D_1$ – $D_4$ are applied to an adder 23. The four bits will normally pass through adder 23 unaffected except in the one case where a negative edge range is indicated and either $D_5$ or $D_6$ is a "1" bit. A negative edge range is indicated by the output of AND gate 27. If $D_5$ or $D_6$ is a "1" bit there will be an output from OR gate 25. The outputs from gates 25 and 27 are applied as inputs to AND gate 29, whose output is applied as an input to the adder 23.

If $\Delta_i$ is an edge level, a logic 1 signal appears on lead 26 and gates bits $D_1$, $D_2$, $D_3$, $D_4$ through AND gates 30 – 34. The latter bits thus appear at the outputs of respective OR gates 40 – 43. If $\Delta_i$ is a non-edge level, a logic 1 signal appears on lead 28 and gates bits $D_3$, $D_4$, $D_5$, $D_6$ through AND gates 35 – 38. The latter bits thus appear at the outputs of respective OR gates 40 – 43. The outputs from the OR gates 40 – 43 are entered into four stages of five stage shift register 44 under control of a pulse on lead 50. The edge indicating lead line 26 is connected to the remaining stage of shift register 44. Thus if $\Delta_i$ is an edge level, a 1 bit is entered into stage $C_1$ and bits $D_1$, $D_2$, $D_3$ and $D_4$ are entered into respective stages $C_2$, $C_3$, $C_4$ and $C_5$ of register 44. If $\Delta_i$ is a non-edge level, a 0 bit is entered into stage $C_1$, and bits $D_3$, $D_4$, $D_5$, and $D_6$ are entered into respective stages $C_2$, $C_3$, $C_4$ and $C_5$. The data in the shift register, which is $\Delta_i^*$ and $k$, is serially shifted out by clock pulses received from an output rate clock pulse generator, not shown. The latter clock pulses are also applied to a divide by five counter 46 which provides one output pulse for every five input pulses. The output pulse from divide by five counter 46 passes through delay means 48 and gates the next $\Delta_i + k$ into shift register 44. The delay is sufficient to allow the last bit in the shift register to be shifted out serially before the next five parallel bits are entered into the shift register.

The output from the parallel to serial converter represents the output of the DPCM on the transmit side. This output is received at the DPCM on the receive side, and, as will be explained, is operated on to reconstruct the original analog waveform. In actual practice there may be other functional elements between the transmit side output of the DPCM and the receive side input of the DPCM. For example the serial bits could be applied to a multiplexer and then to an error coder for improving the system bit error rate probability and then to a PSK modulator for transmitting the information via a satellite transponder. On the receive side the received signal would be PSK demodulated, applied to an error decoder which cooperates with the latter mentioned error coder, and then through a demultiplexer. However, any additional equipment interposed between the transmit and receive sides of the DPCM is not important to a complete understanding of the present invention. Whatever transmission equipment is interposed at the transmission end, corresponding receiver equipment is interposed at the receive end, so that the bit stream into the receive side of the DPCM is the same, except for possible errors, as the bit stream out of the transmit side of the DPCM. Furthermore, the parallel to serial converter may be unnecessary. As will be apparent it may be desirable to apply the output of bit selection logic to other means, e.g., a multiplexer, in parallel rather than in series. This can easily be accomplished by shifting out the contents of register 44 in parallel.

Figures 4, 5, 10:
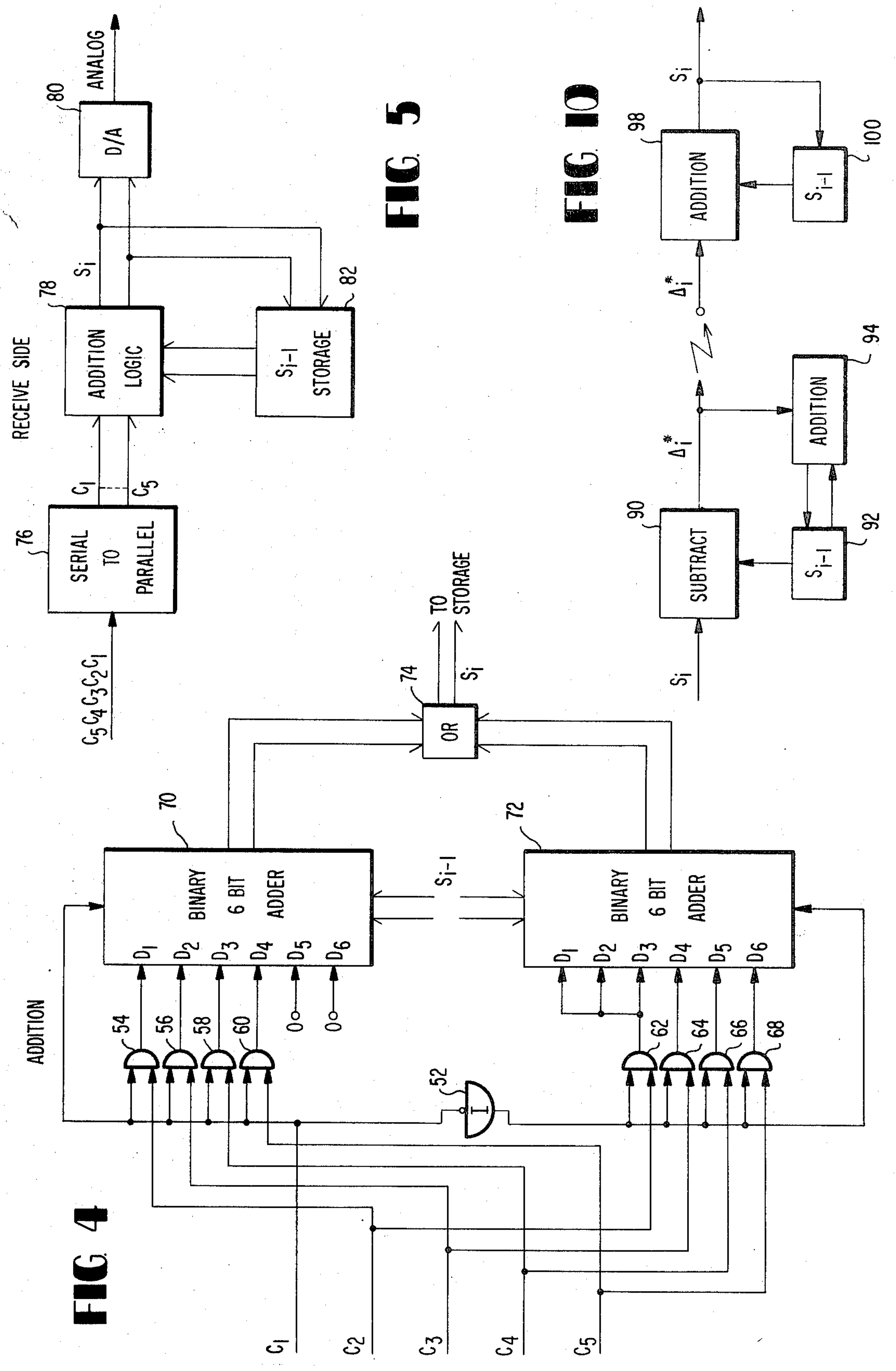
FIG. 4 is a logic diagram showing the details of the addition logic of FIG. 1.
FIG. 5 is a general block diagram of the receive side of differential pulse code modem.
FIG. 10 is a block diagram of a third example of a differential pulse code modem.

Referring back to FIG. 1, there is provided an addition logic circuit 22 which operates to add $\Delta_i$ to $S_{i-1}$ to form $S_i$, which value is then placed in a storage means 24 to replace $S_{i-1}$. One specific example of the addition logic is illustrated in FIG. 4. The inputs designated $C_1$ through $C_5$ correspond to the same five inputs to the shift register of FIG. 3. Thus when $C_1 = 1$ an edge range is indicated. When $C_1 = 0$ a non-edge range is indicated.

The addition logic comprises INVERT gate 52, AND gates 54 – 68, a pair of six bit binary adders 70 and 72, and an OR gate 74. Each binary adder is adapted to receive two six bit binary vectors, add the two input vectors, and provide a six bit parallel output through OR gate 74 to the storage means 24 of FIG. 1. During the addition operation, any carry over to the seventh bit position does not appear in the adder output. The six bit vector $S_{i-1}$ is applied to both adders 70, 72 from storage means 24. The other input to the respective adders depends upon the code $\Delta_i$* and $k$, received from the bit selection logic.

If $C_1 = 1$, thereby indicating an edge range, the bits $C_2$, $C_3$, $C_4$ and $C_5$ are gated through gates 54 – 60 and applied to input terminals $D_1$, $D_2$, $D_3$ and $D_4$, respectively, of adder 70. Binary 0 bits are always entered into input terminals $D_5$ and $D_6$. The latter correspond to the two low order bits dropped from $\Delta_i$ in the bit selection logic to form $\Delta_i$*. It will be apparent that since the input bits to $D_5$ and $D_6$ are always binary 0's, even though the $D_5$ and $D_6$ bits in $\Delta_i$ could have been any value between 00 and 11, the six bit vector into binary adder 70 will not always be identical to the six bits $D_1$ – $D_6$ of $\Delta_i$. However, as noted previously, this small difference is tolerable quantization noise in the edge range. The "1" bit at $C_1$ is also applied to an input of adder 70 which initiates the addition operation.

If $C_1 = 0$, indicating a non-edge range, the bits $C_2$ – $C_5$ are gated through AND gates 62 – 68 and applied to the respective input terminals $D_3$ – $D_6$ of adder 72. The gating signal appears at the output of gate 52. The latter signal also initiates the addition operation of adder 72. It will be noted that when $\Delta_i$ is in the non-edge range, bit $C_2$ is applied to input terminals $D_1$ and $D_2$ as well as input $D_3$ of adder 72. The bits applied to $D_1$ and $D_2$ correspond to the bits $D_1$ and $D_2$ of $\Delta_i$ which were eliminated in the bit selection logic. For the specific example described herein, it can be seen from Table I that whenever $\Delta_i$ is in the non-edge range, bits $D_1$, $D_2$ and $D_3$ will be identical.

A general block diagram of the receive side of the DPCM is illustrated in FIG. 5 and comprises a five bit serial to parallel converter 76, a six bit storage means 82, an addition logic circuit 78, and a digital to analog converter 80. The serial to parallel converter 76 receives $\Delta_i$* and $k$, in serial bit stream, and provides a five bit parallel output, $\Delta_i$* and $k$ — also designated by bit symbols $C_1$ $C_2$ $C_3$ $C_4$ $C_5$. Any conventional word synchronizing technique may be used to insure five bit word synchronization between the transmit side and receive side. Such synchronization techniques are well known in digital communications systems which transmit via a satellite transponder. The output from converter 76 along with the six bit word stored in storage means 82 is applied to addition logic 78. The addition logic 78 may be identical to the addition logic on the transmit side, an example of which is illustrated in previously described FIG. 4.

The output from logic 78 is the six bit reconstructed sample $S_i$. The latter sample $S_i$ is entered into storage means 82 and serves as $S_{i-1}$ for the next cycle of operation. The sample $S_i$ is also converted into an analog signal by converter 80. The output from converter 80 thus represents the reconstructed input signal waveform.

In the detailed description of the specific embodiment it was pointed out that the quantization levels in the edge range may be other than those shown in Table II. It was further pointed out that the levels selected were chosen for ease of implementation. For example, the following difference levels, $$+51 \equiv 110011$$

$$+50 \equiv 110010$$

$$+49 \equiv 110001$$

$$+48 \equiv 110000,$$

can be quantized as +48 by simply eliminating $D_5$ and $D_6$ and replacing them with two "0" bits on the receive side.

One may question why this technique of simply replacing $D_5$ and $D_6$ with binary 0's is not used to quantize the negative edge levels. The answer is that to do so would cause foldover error. This can easily be explained by the following example. Suppose the following difference levels, $$-17 \equiv (1)\mathbf{101111}$$

$$-18 \equiv (1)\mathbf{101110}$$

$$-19 \equiv (1)\mathbf{101101}$$

$$-20 \quad (1)\mathbf{101100}$$

were all quantized as −20. As is apparent, this could be accomplished by simply dropping $D_5$ and $D_6$ and replacing them with two "0" bits on the receive side. However, this creates a possible foldover error. Assuming $S_i$=+1 and $S_{i+1}$=+18, $\Delta_i$ will be −17. However, quantizing $\Delta_i$ as −20 and adding that value to $S_{i+1}$ results in an error as follows,

| | |
|---|---|
| $S_{i+1}$ | 010010 |
| (+) $\Delta_i$ | 101100 |
| $S_i$ | 111110 = +62. |

The error is caused because the quantization level selected is not a large enough binary number to insure that the sum will be "folded over" past zero when the quantization level is added to $S_{i+1}$.

To insure against this foldover error, when four adjacent difference levels are grouped together for quantization, they are quantized into the one represented by the largest binary number. Thus, the levels $$-16 \equiv (1)110000$$

$$-17 \equiv (1)101111$$

$$-18 \equiv (1)101110$$

$$-19 \equiv (1)101101,$$

are all quantized as −16.

It will also be apparent to one of ordinary skill in the art that quantization in the negative edge range could be carried out, without resulting in foldover error, by dropping $D_5$ and $D_6$ and replacing them with two "1" bits. However, this could not be done in the positive edge range without causing foldover error. Suffice it to say that the actual values of the quantization levels are not critical to the invention, the important feature being that a given binary vector may represent two disjoint quantization levels.

The invention thus far has been described, generally, in terms of a bandwidth reduction technique for transmitting edges of a TV waveform. As discussed, a five bit code word including one bit identifying an edge or non-edge region is transmitted in each sample period. However, as will now be described, it is possible to further reduce the bandwidth required to transmit edge information of a TV waveform utilizing the inventive concepts already discussed.

To transmit one line of TV luminance information requires, for example, approximately 318 samples. Therefore, with the technique of the previously described embodiment, 318 bits, one for each sample, is required to inform the receiver whether the following four bits represents an edge or non-edge level. However, it has been determined that on the average each line of TV wave form will comprise approximately 50 edge regions. In the alternative embodiment to be described, advantage is taken of this average by transmitting an edge identifying code word, hereinafter referred to as a marker or flag, only when an edge is detected. More specifically, in response to a $\Delta_i$ in the non-edge region, only a four bit code word identifying the difference level is transmitted.

However, in response to a $\Delta_i$ in the edge region, the four bit word representing said level will be preceeded in the transmitted bit stream by a four-bit marker code word. With an average of only 50 edges per line, the technique of the alternative embodiment requires the transmission of an average of only 200 (4 × 50) range identifying bits per line, whereas in the first embodiment described above, 318 range identifying bits would be transmitted.

Figure 6:
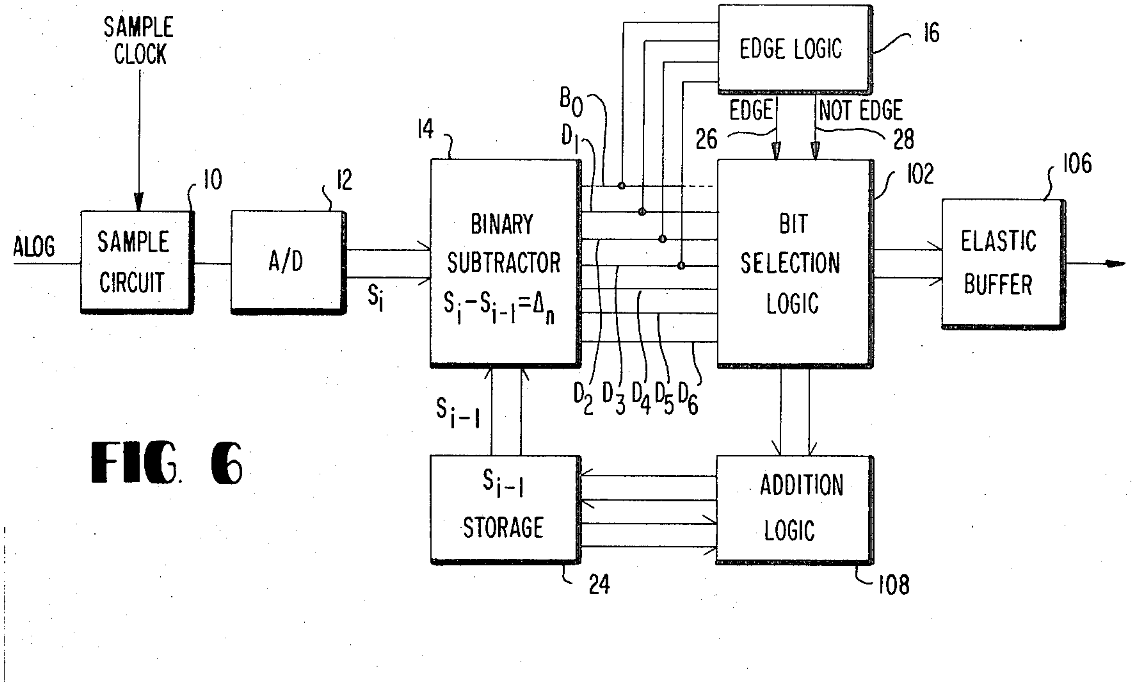
FIG. 6 is a block diagram of the transmit side of a second embodiment of a differential pulse code modem.

All of the assumptions made in connection with the description of the first embodiment will be carried over to the description of this alternate embodiment. For example, the difference levels and quantization levels are assumed to be the same as shown in Tables I and II. There is an exception. In this embodiment either +7 (0111) or −8 (1000) or both will not be used as non edge levels. Instead the four bits codes (0111) and/or (1000) will be reserved as marker codes. Simple logic can easily be provided for quantizing difference values $\Delta_i = +7$ and/or $\Delta_i = -8$ as the lowest positive or negative edge levels. Also, many of the same or similar functional elements can be used and where such elements are similar to those used in the previously described embodiment, they will not be described in detail herein. FIG. 6 illustrates a general block diagram of the transmitter side of the alternative embodiment of the DPCM. It will be appreciated that the general block diagram differs from FIG. 1 only in the addition of an elastic buffer 106. It should also be noted that the bit selection logic 102 and addition logic 108 are different for this embodiment. As in the previous embodiment, the output of binary subtractor 14 provides a difference value and the edge logic 16 provides an indication whether the difference value represents an edge or a non-edge. Bit selection logic 102 differs from the prior embodiment in that here there is no additional bit tacked on to every four-bit code. Instead, if the difference represents a non-edge level, the four-bit code selected by the bit selection logic 102 is transmitted without any range indicating indica. On the other hand, if the difference level is an edge level, the four-bit code selected by bit selection logic 102 is preceded by a special four-bit marker code indicating that an edge level follows.

Figure 7:
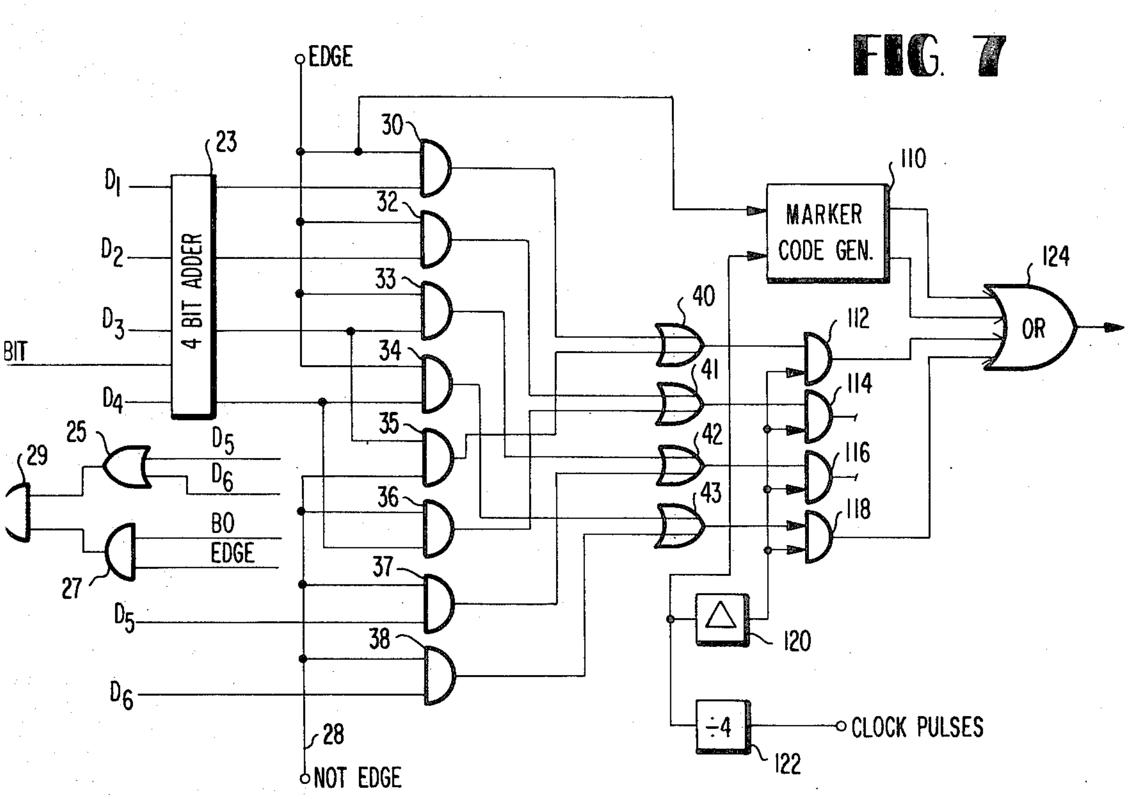
FIG. 7 is a logic diagram showing the details of the bit selection logic of FIG. 6.

An example of suitable logic circuitry for use as the bit selection logic 102 of FIG. 6 is illustrated in FIG. 7. It will be noted that the logic of FIG. 7 preceding OR gates 40, 41, 42 and 43 is identical to the logic of FIG. 3. FIG. 7 differs in that it includes a divide by four counter 122, a four-bit marker code generator 110, AND gates 112 through 118, and an OR gate 124. The four bits representing a quantization level appear in parallel at the outputs of OR gates 40 through 43, respectively. Locally generated clock pulses at the serial bit rate are applied to a divide by four counter 122 whose output is applied through a delay means 120 to the inputs of AND gates 112 through 118. The output of delay means 120 clocks the four bits through OR gating means 124 to the parallel to serial converter 104. If the four bits represent a non-edge level, no other bits pass through the OR circuit 124. However, when the four bits represent an edge level, an input is applied to the four-bit marker code generator 110 to prepare it for generating a four-bit marker code. The latter marker code will be generated in response to an output from divider 122. It will be noted that in the case of an edge level, the four bits representing the level will be passed through OR circuit 124 immediately after the four-bit marker code. The output from OR circuit 124 is applied to the elastic buffer 106 which operates in a conventional manner to smooth the bit rate applied to the output for ultimate transmission to the receiver.

Figure 8:
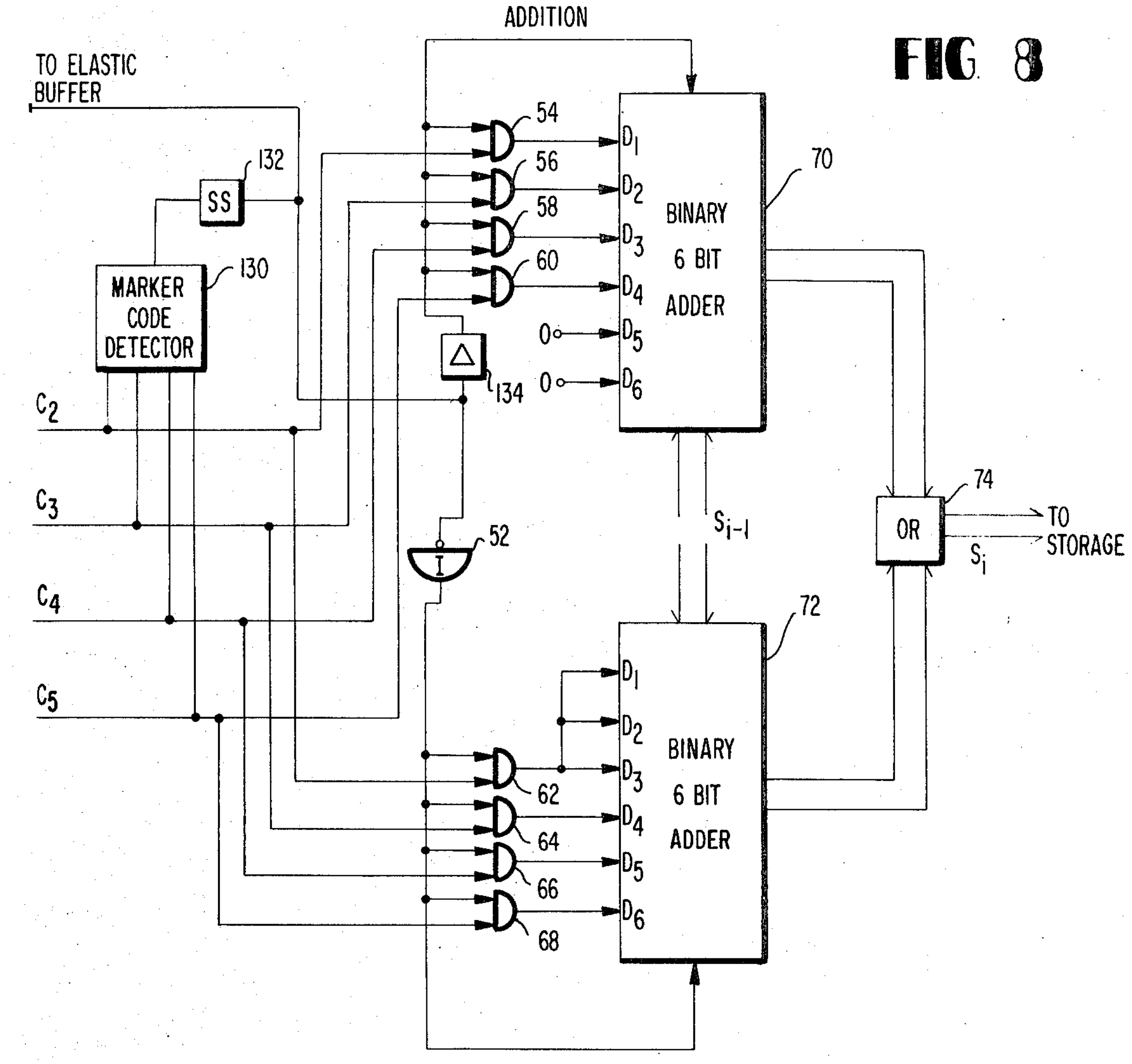
FIG. 8 is a logic diagram showing the details of the addition logic of FIG. 6.

Referring back to FIG. 6, the addition logic 108 also differs slightly from the addition logic 22 in FIG. 1. The difference is that here each four-bit code is treated as a non-edge level in the absence of the special four-bit marker code indicating the presence of an edge level. A simple example of the logic suitable for the addition logic 108 is illustrated in FIG. 8. It will be noted that FIG. 8 is substantially identical to FIG. 4 of the first embodiment with certain exceptions. FIG. 8 does not receive the $C_1$ bit, which in the first embodiment indicates the presence or absence of an edge level. Furthermore, FIG. 8 includes a marker code detector 130, a single shot 132 and a delay means 134. The input to the marker code detector comprises the four parallel output bits from OR circuit 124 (FIG. 7). These four bits are normally applied through AND gates 62 through 68 and thereafter treated as a non-edge indicating level. When the four-bit marker code appears, marker code detector 130 provides an output which triggers single shot 132. The output from single shot 132 is applied to invert gate 52 to thereby block the AND gates 62 through 68. The output from single shot 132 is also supplied through a delay means 134 to AND gates 54 through 60. Delay means 134 provides a brief delay substantially equal to the delay provided by delay means 120 (FIG. 7). Thus, the four-bit marker code from generator 110 will neither pass through AND gates 62 to 68 or through AND gates 54 through 60. However, the immediately succeeding four-bits, which represent an edge level, will be passed through AND gates 54 through 60.

Figure 9:
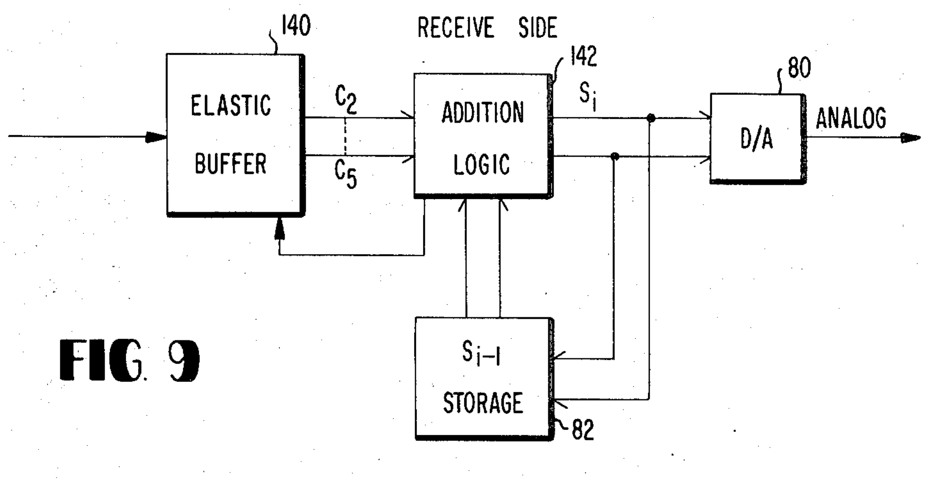
FIG. 9 is a general block diagram of the receive side of a second embodiment of a differential pulse code modem.

The rest of the operation of the apparatus shown in FIG. 6 may be identical to that of FIG. 1. The receive side of the alternate embodiment of the DPCM is illustrated in FIG. 9. It will be appreciated that FIG. 9 is similar to FIG. 5. The differences are that in FIG. 9 the receiver includes an elastic buffer 140, and the addition logic 142 is different than the addition logic of FIG. 5. The elastic buffer of FIG. 9 may be a conventional elastic buffer which receives a serial bit stream at its input and provides a four-bit parallel output. The four-bit parallel outputs from the elastic buffer 140 normally occur periodically in response to periodic clock pulses, not shown in the drawing. However, each time the four-bit output from the buffer 140 represents the marker code, the succeeding four-bits will be immediately read out thus causing the read-out timing from elastic buffer 140 to be substantially the same as the read-in timing to the elastic buffer 106.

The addition logic 142 is identical to the addition logic 108 used at the transmit side. Details of this addition logic are shown in FIG. 8. However, unlike the addition logic on the transmit side, the single shot 132 on the receive side provides an output to the elastic buffer which causes the immediate read-out of the succeeding four parallel bits whenever the four-bit marker code occurs. The duration of single shot 132 is such that an edge level represented by the same four bits as the marker code will not retrigger the single shot 132.

As one example for the choice of "marker" code words, and referring to Table II, two marker code words 0111 and 1000 may be employed. While either "marker code" will indicate the presence of an edge sample, the use of two markers will enable the identification of a fifth-bit (which is not transmitted) and, hence, increase the number of quantization levels wherein the fifth-bit is the fifth most significant bit of the difference signal $\Delta_i$. If, for example, the fifth most significant bit, which is truncated by bit selection logic 102 happens to be a binary "1" then the marker code word 1000 may be transmitted. On the other hand, if the fifth most significant bit is a binary "0" then the marker code word 0111 will be transmitted. This last mentioned technique provides an even further increase in the number of quantization levels obtainable for a given number of code bits.

Although the invention has been described above in connection with two specific embodiments, it will be apparent to anyone of ordinary skill in the art that the invention is not limited to a six bit sample, five or four bit output DPCM. Furthermore, although the specific examples included two ranges of difference levels, one including disjoint levels and the other including normal levels, the invention is not intended to be so limited. In its broadest aspect the invention is the use of disjoint intervals in a DPCM. A simple embodiment will be described with reference to FIG. 10 to illustrate this point.

For the embodiment to be described, assume that a differential pulse code modulator receives three bit sequences, $X_1 X_2 X_3$, representing samples $S_i$, where $i$ = 1, 2, 3, 4, etc. The dynamic range of the input is shown in Table III.

$S_{i-1}$ is subtracted from $S_i$ in subtraction means 90 to from the difference value $\Delta_i$ which may range from +7 to −7. All possible $\Delta_i$ values are represented in Table IV. Note that four bits (including borrow bit $B_0$) are needed to uniquely identify the $\Delta_i$ values. However, because of the use of disjoint intervals, only three bits need be transmitted. This is accomplished by simply not including the borrow bit at the output of subtraction means 90.

Assume $\Delta_i$ = +2 which is represented by:

$Y_1Y_2Y_3B_0$ 0 1 0 0

The code $\Delta_i^* \equiv$ 010, which would represent −6 as well as +2, is transmitted. However since the actual $\Delta_i$ is +2 then $S_{i-1}$, presently stored in storage means 92, must be in the range of 0 to +5. The binary addition of 010 in binary adder 94 to any number in the range 0 to 5 will give the correct value $S_i$. Assume, for example, $S_{i-1}$ = +3. Then,

| | | |
|---|---|---|
| $S_{i-1}$ | +3 | 011 |
| $+\Delta_i$ | +(+2) | 010 |
| $S_i$ | +5 | 101 |

| TABLE III | $X_1X_2X_3$ | TABLE IV | $Y_1Y_2Y_3$ $B_0$ |
|---|---|---|---|
| +7 | 1 1 1 | +7 | 1 1 1 (0) |
| +6 | 1 1 0 | +6 | 1 1 0 (0) |
| +5 | 1 0 1 | +5 | 1 0 1 (0) |
| +4 | 1 0 0 | +4 | 1 0 0 (0) |
| +3 | 0 1 1 | +3 | 0 1 1 (0) |
| +2 | 0 1 0 | +2 | 0 1 0 (0) |
| +1 | 0 0 1 | +1 | 0 0 1 (1) |
| 0 | 0 0 0 | 0 | 0 0 0 (0) |
| | | −1 1 1 1 (1) | |
| | | −2 | 1 1 0 (1) |
| | | −3 | 1 0 1 (1) |
| | | −4 | 1 0 0 (1) |
| −5 | | | 0 1 1 (1) |
| | | −6 | 0 1 0 (1) |
| | | −7 | 0 0 1 (1) |

If $\Delta_i$ = −6 the same 010 sequence will be transmitted. In binary parlance 010 actually represent +2. However when +2 (010) is added in a binary adder to $S_{i-1}$ (which for this case must be in the range between +7 and +6), and provided the last carry over bit is eliminated, it will be the same as adding −6.

| | | |
|---|---|---|
| $S_{i-1}$ | +7 | 111 |
| $+\Delta_i$ | + (−6) | 010 |
| $S_i$ | +1 | 001 |

The explanation of the addition means 98 and storage means 100 on the receive side is identical to that of means 92 and 94 on the transmit side. In each case the addition logic receives $\Delta_i^*$, adds $\Delta_i^*$ to $S_{i-1}$, dropping any carry over to the fourth bit position, resulting in a three bit output $S_i$.

What is claimed is:

1. A differential pulse code modem for transmitting X difference levels with N-bit binary vectors, where $X > 2^N$, comprising, a. means for subtracting an input signal at time $t_{i-1}$ from the said input signal at time $t_i$, to develop difference values $\Delta_i$, where $i$ = 1, 2, 3, . . . etc., b. means responsive to each said difference value $\Delta_i$ for generating an N bit binary vector, where at least some binary N bit vectors represent two disjoint difference values, and c. means for transmitting said binary N bit vectors.

2. A differential pulse code modulator as claimed in claim 1 wherein said subtracting means comprises, a. a subtractor having two inputs, one of which is adapted to receive said input signal at time $t_i$, b. a storage means for storing a quantity representing the input signal at time $t_{i-1}$, the said quantity being connected to the other input of said subtractor, and c. addition logic means connected between said storage means and said N-bit binary vector generating means for adding $\Delta_i$ represented by said N-bit binary vector to the quantity in said storage means and replacing the said quantity with the sum formed by said addition logic.

3. A differential pulse code modulator as claimed in claim 2 further comprising a receiver for receiving said N bit binary vector and reconstructing said input signal, said receiver comprising, a. storage means for storing a quantity therein b. addition logic means responsive to each N bit binary vector for adding $\Delta_i$ represented by said vector to the quantity stored in said storage means, and c. means for replacing said quantity in said storage means with the sum formed by said addition logic.

4. A differential pulse code modem for conveying a series of items of information $S_i$, where $i$ represents the order of occurrance, between first and second stations, the maximum dynamic range of said items being $2^m$, where each item is represented by an M-bit binary vector, said modem comprising a transmit portion and a receive portion, said transmit portion comprising, a. storage means for storing an M-bit binary vector, b. binary subtraction means connected to said storage means and also connected to receive said series of items of information, for subtracting said stored M-bit vector from $S_i$ to develop a binary difference $\Delta_i$, wherein each $\Delta_i$ is represented by an M-bit binary vector $S_i$, c. means responsive to $\Delta_i$ when $\Delta_i$ is in a predetermined range of possible values for $\Delta_i$ for generating an N-bit binary vector $\Delta_i$*, where $N \leq M$ and wherein some $\Delta_i$* binary vectors represent two disjoint difference values, and for transmitting $\Delta_i$*, d. combining means responsive to said N bit binary vector $\Delta_i$* and said stored M bit vector for adding $\Delta_i$ to said stored M bit vector to form a sum M bit vector, and e. means for replacing the M bit vector stored in said storage means with said sum M bit vector.

5. A differential pulse code modulator as claimed in claim 4 wherein said combining means comprises, a. means adapted to add M-N low order bits to each $\Delta_i$* generated by said generating means to form an M bit vector substantially identical to $\Delta_i$, and b. binary addition means for adding said last mentioned M bit vector to said stored M bit vector, and dropping any carry over bit to the M+1 bit position, to form said M bit sum.

6. A differential pulse code modulator as claimed in claim 5 wherein said predetermined range is the entire range of possible $\Delta_i$ difference values

7. A differential pulse code modulator as claimed in claim 4 wherein all values of $\Delta_i$ greater than a reference positive value or less than a reference negative level are within said predetermined range.

8. A differential pulse code modulator as claimed in claim 7 wherein said generating means further comprises means for generating a K bit code indicating that $\Delta_i$ is within said predetermined range, and transmitting said K bit code along with $\Delta_i$* to indicate that $\Delta_i$* represents a $\Delta_i$ value within said predetermined range.

9. A differential pulse code modulator as claimed in claim 8 further comprising, a. second generating means responsive to $\Delta_i$, when $\Delta_i$ is outside of said predetermined range, for generating an N bit binary vector $\Delta_i$*, wherein each $\Delta_i$* vector generated by said second generating means represents only one difference level $\Delta_i$ outside said predetermined range.

10. A differential pulse code modulator as claimed in claim 9 wherein said second generating means comprises, a. means for selecting the N least significant bits of $\Delta_i$ for each $\Delta_i$ outside said predetermined range, and b. means for generating a K bit code indicating that $\Delta_i$ is outside said predetermined range and transmitting said K bit code along with $\Delta_i$* to indicate that $\Delta_i$* represents a $\Delta_i$ value outside said predetermined range.

11. A differential pulse code modulator as claimed in claim 10 wherein said combining means comprises, a. means responsive to each K bit code generated for detecting whether the associated $\Delta_i$* represents a $\Delta_i$ which is within or outside said predetermined range, b. means responsive to a detection by said detecting means that $\Delta_i$* represents a $\Delta_i$ which is within said predetermined range for adding M–N low order bits to $\Delta_i$* to form an M-bit vector substantially identical to $\Delta_i$ at least in the N most significant bit positions, c. means responsive to a detection by said detecting means that $\Delta_i$* represents a $\Delta_i$ outside said predetermined range for adding M-N high order bits to $\Delta_i$* to form an M-bit vector identical to $\Delta_i$, and d. binary addition means for adding the M-bit vector formed by either of said latter two means to said stored M-bit vector, and dropping any carry over bit to the M+1 bit position, to form said M bit sum.

12. A differential pulse code modulator as claimed in claim 11 wherein K is a 1 bit code which is either a 1 or 0 depending on whether $\Delta_i$ is within or outside said predetermined range,

13. A differential pulse code modulator as claimed in claim 4 wherein said receive portion of said modem comprises, a. a storage means for storing an M-bit vector, b. means responsive to the receipt of $\Delta_i$* for combining $\Delta_i$ represented thereby with said stored M-bit vector to form an output M bit vector, and c. means for replacing said M bit vector in said storage means with said output M-bit vector.

14. A differential pulse code modulator as claimed in claim 6 wherein said receive portion of said modem comprises, a. a storage means for storing an M-bit vector, b. means responsive to the receipt of each $\Delta_i$* for adding M–N low order bits to each $\Delta_i$* to form an M-bit vector identical to $S_i$ at least in the N most significant bit positions, c. binary addition means for adding said last mentioned M-bit vector to said stored M-bit vector and dropping any carry over bit to the M+1 bit position, to form an output M-bit vector, and d. means for replacing said M-bit vector stored in said storage means with said output M-bit vector.

15. A differential pulse code modulator as claimed in claim 11 wherein said receive portion of said modem comprises, a. a storage means for storing an M-bit vector, b. means responsive to the receipt of each K-bit code and associated $\Delta_i^*$ for detecting whether $\Delta_i^*$ represents a $\Delta_i$ value within or outside said predetermined range, c. means responsive to a detection by said latter detecting means that $\Delta_i^*$ represents a $\Delta_i$ value which is within said predetermined range for adding M–N low order bits to $\Delta_i^*$ to form an M-bit vector identical to $\Delta_i$ at least in the N most significant bit positions, d. means responsive to a detection by said latter detection means that $\Delta_i^*$ represents a $\Delta_i$ value outside said predetermined range for adding M–N high order bits to $\Delta_i^*$ to form an M-bit vector identical to $\Delta_i$, e. binary addition means for adding the M-bit vector formed by either of said latter two means to said stored M-bit vector, and dropping any carry over bit to the M+1 bit position, to form an output M-bit vector, and f. means for replacing said M-bit vector stored in said storage means with said output M-bit vector.

16. A differential pulse code modulator as claimed in claim 15 wherein K is a 1 bit code which is either a 1 or 0 depending on whether $\Delta_i$ is within or outside said predetermined range.

17. A differential pulse code modulator as claimed in claim 16 wherein M–N ≥ 2.

18. A method of converting an input signal into code form, from which said input signal is reproducable, comprising, a. sampling the input signal to form a series of samples, b. forming a difference value for each sample representing the difference between said sample and the preceeding sample, c. detecting whether said difference value is in a first or second range of possible difference values, d. selecting a code word from a limited set of code words to signify said difference value, at least some of said code words being selected for three unlike difference values, one in the first range and two disjoint difference values in the second range, and e. generating a signal to distinguish code words representing levels in said first range from code words representing levels in said second range.

19. The method as claimed in claim 18 wherein every code word in said limited set respectively represents a unique difference value within said first range of difference values.

20. The method as claimed in claim 19 wherein the step of generating comprises generating a single bit of a first value to accompany each code word representing a difference value in said first range, and generating a signal of a second value to accompany each code word representing a difference value in said second range.

21. The method as claimed in claim 19 wherein the step of generating comprises generating a marker code to accompany only those code words representing difference values in said second range.

22. A differential pulse code modem for converting an input signal into a digital representation thereof comprising, a. means for periodically forming difference values equal to the amplitude difference of adjacent periodic samples of said input signal, b. code selecting means responsive to said difference values for selecting one of a limited set of codes to represent said difference value, said code selecting means comprising means responsive to difference values +|A| and −|B| for selecting the identical code C to represent said difference values, where |A| + |B| equals the dynamic range of the input signal.

* * * * *